Jan. 8, 1924.

E. H. SMITH

CUTTING TORCH TIP

Filed May 12, 1919

1,480,310

Inventor:
Elmer H. Smith
By Paul & Paul
his Attorneys

Patented Jan. 8, 1924.

1,480,310

UNITED STATES PATENT OFFICE.

ELMER H. SMITH, OF MINNEAPOLIS, MINNESOTA.

CUTTING TORCH TIP.

Application filed May 12, 1919. Serial No. 296,490.

*To all whom it may concern:*

Be it known that I, ELMER H. SMITH, a citizen of the United States, resident of Minneapolis, county of Hennepin, State of Minnesota, have invented certain new and useful Improvements in Cutting Torch Tips, of which the following is a specification.

The object of my invention is to provide a cutting tip that is adapted for use in a welding torch for cutting purposes. Generally a separate torch is required for each type of tip.

A further object is to provide a torch tip adapted for the same purpose as the tip shown and described in my allowed application Serial No. 235,760, filed May 31, 1918.

In the accompanying drawings forming part of this specification,

Figure 1:
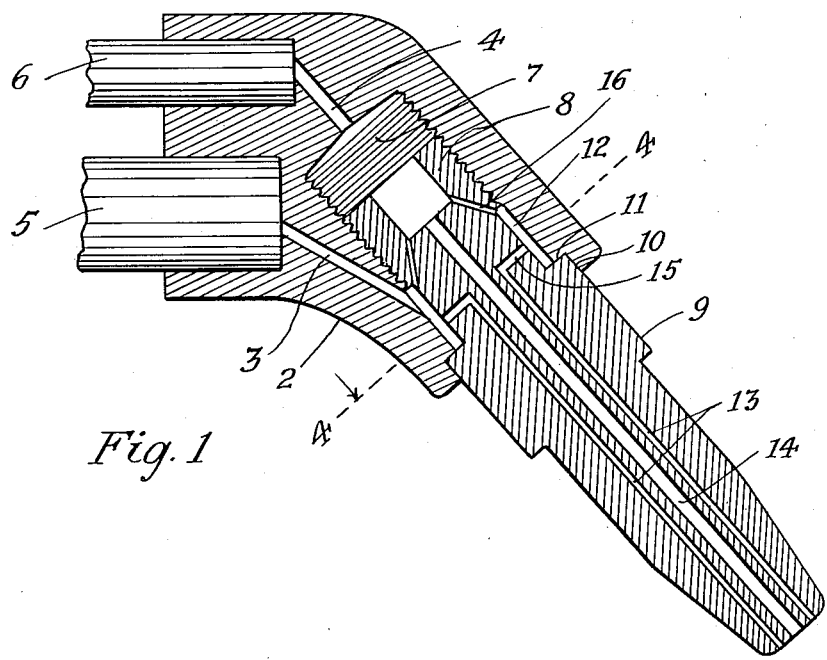
Figure 1 is a sectional view through a tip and torch head embodying my invention.
Figure 2:
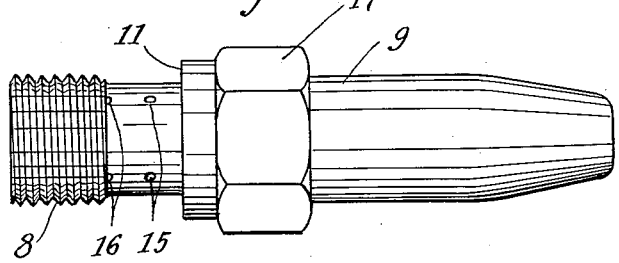
Figure 2 is an outside view of the tip removed from the head.
Figure 3:
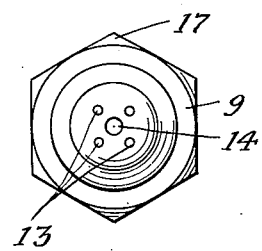
Figure 3 is an end view of the tip.
Figure 4:
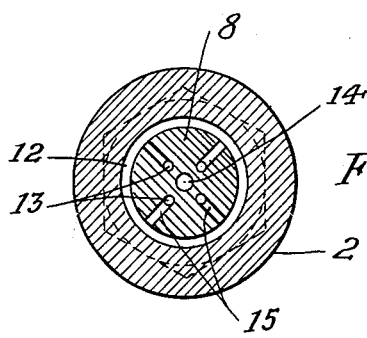
Figure 4 is a sectional view on the line 4—4 of Figure 1.

In the drawing, 2 represents the head of the torch, having passages 3 and 4 formed therein, communicating with pipes 5 and 6 through which acetylene gas and oxygen are conducted from a suitable source, not shown. The end of the head has a recess 7 therein which communicates with the oxygen passage 4 and is interiorly threaded to receive the exteriorly threaded end 8 of the tip 9. The head also has an annular recess 10 forming a shoulder against which the wall 11 of the tip is seated and the threads in the wall of the recess 7 are cut away and the threads on the end portion 8 of the tip are omitted at this point, forming an annular recess 12 between the shoulder 11 and the threaded portion of the tip end. Longitudinal ducts 13, preferably four in number, are provided in the tip around the central oxygen duct 14 and ports 15 lead from the passage 12 to the ducts 13 and as the acetylene duct 3 communicates with the recess 12 the gas may flow freely therefrom around the end of the tip and entering the ports 15 may flow outwardly through the ducts 13 to the end of the tip.

I also prefer to provide comparatively small ducts 16 leading from the oxygen recess 7 to the recess 12 so that a small volume of the oxygen may flow through the duct 16 and mingle with the acetylene in the recess 12. The tip is provided with the usual surface 17 to receive a wrench and whenever desired, may be easily and quickly mounted in the head, the shoulder 11 forming a gas-tight joint in the recess 10 and preventing the escape of acetylene at this point, there being a sufficient number of threads between the passage 12 and the recess 7 to prevent the oxygen from working around the end of the tip to the passage. A sufficient amount of oxygen will flow through the ports 16 to mingle with the acetylene and form a mixture for the heating flame, while the main volume of oxygen will flow down the duct 14 and contacting with the metal after it has become heated, will form a cutting jet, the cut in the metal corresponding to the diameter of this jet.

My invention eliminates the use of an independent or separate oxygen tube and the necessity of providing a separate torch for the welding and cutting operations. An ordinary welding torch can be easily and quickly adapted for cutting purposes by mounting one of my improved tips therein.

I claim as my invention:

1. An oxy-acetylene torch comprising a head having a socket therein screw-threaded at its base and having an inter-fitting outer end and a portion enlarged relative to the screw-threaded portion between the screw-threaded portion and the inter-fitting outer end, a tip open at both ends and all in one piece screw-threaded at one end and having a peripherally enlarged portion inter-fitting gas-tight with said outer inter-fitting end of the socket said tip having a plurality of separate ducts extending from the outer end of the tip to said enlarged portion of the opening in the head, and a duct extending from the outer end of the tip entirely through the tip lengthwise thereof and opening into the socket in the head.

2. An oxy-acetylene torch having a head provided with passages for acetylene gas and oxygen, and having therein a socket screw-threaded at its base and communicating with said passages, a tip screw-threaded at its end and terminating within the socket and fitting within said socket, said tip having a longitudinal duct extending from end to end and communicating with the oxygen passage in said head, said tip and the walls of said socket having an annular passage formed therein between the screw-threaded portions and the end of the socket and communicating with the acetylene passage in said head, said tip having a plurality of independent ducts leading separately from said annular passage to the outer end of the tip grouped around said oxygen duct.

3. An oxy-acetylene torch having a head provided with passages for the acetylene gas and oxygen and having a recess therein communicating with said passages, the outer end of said head having a seat formed therein around said recess, a tip fitting within said recess and having a shoulder fitting said seat, said tip having a longitudinal duct communicating with the oxygen passage in said head, the inner end of said tip having a threaded connection with the walls of said recess and an annular passage being formed in said tip and head between said threads and the shoulder on said tip and communicating with said acetylene gas passage, said tip having a series of independent ducts leading separately from said passage to the outer end of the tip and grouped around said oxygen duct and ports provided in said tip communicating with said oxygen passage and with said annular passage.

4. An oxy-acetylene torch having a head provided with passages for acetylene gas and oxygen and a recess communicating with said passages, a one-piece tip fitting within said recess and having a longitudinal duct communicating with the oxygen passage in said head, said tip having a plurality of independent ducts extending substantially the full length of said tip and grouped around said oxygen passage, said ducts communicating at their inner ends with the acetylene passage in said head, and said tip also having ducts leading from the oxygen passage therein to the juncture of the acetylene passage in said head with the inner ends of the ducts grouped around said oxygen passage.

5. An oxygen acetylene torch having a head provided with passages for the acetylene gas and oxygen, said passages being unobstructed and having supply pipes communicating with one end of said passages and said head having a recess communicating with the other ends of said oxygen and acetylene passages, a tip removably fitting within said recess and having an oxygen passage forming an unobstructed continuation of the oxygen passage in said head and extending to the end of the tip, said tip also provided with a plurality of independent ducts grouped around said oxygen passage and extending substantially the full length of said tip and communicating at their inner ends with said acetylene passage, and said tip having ports leading from said oxygen passage to the acetylene passage in said head and the plurality of ducts in said tip.

In witness whereof, I have hereunto set my hand this 28" day of April, 1919.

ELMER H. SMITH.